(12) United States Patent
Sekime

(10) Patent No.: US 7,760,304 B2
(45) Date of Patent: Jul. 20, 2010

(54) LIQUID CRYSTAL DISPLAY DEVICE AND ELECTRONIC APPARATUS FOR THE REDUCTION OF COLOR IN A WHITE DISPLAY

(75) Inventor: Tomoaki Sekime, Shiojiri (JP)

(73) Assignee: Sony Corporation, Tokyo (JP)

( * ) Notice: Subject to any disclaimer, the term of this patent is extended or adjusted under 35 U.S.C. 154(b) by 345 days.

(21) Appl. No.: 11/896,582

(22) Filed: Sep. 4, 2007

(65) Prior Publication Data

US 2008/0062339 A1 Mar. 13, 2008

(30) Foreign Application Priority Data

Sep. 8, 2006 (JP) ............................. 2006-243742
Jul. 31, 2007 (JP) ............................. 2007-198516

(51) Int. Cl.
*G02F 1/1337* (2006.01)
*G02F 1/1335* (2006.01)

(52) U.S. Cl. ....................................... 349/129; 349/109

(58) Field of Classification Search ................. 349/108, 349/109, 129, 146
See application file for complete search history.

(56) References Cited

U.S. PATENT DOCUMENTS 6,583,839 B2 6/2003 Suzuki et al.
6,987,551 B2 1/2006 Suzuki et al.
2005/0099573 A1* 5/2005 Kubo et al. ................. 349/146
2005/0264720 A1 12/2005 Itou et al.
2005/0264743 A1 12/2005 Suzuki et al.

FOREIGN PATENT DOCUMENTS

| JP | A-10-307295 | 11/1998 |
| JP | A-2005-141036 | 6/2005 |
| JP | A 2005-234527 | 9/2005 |
| JP | A-2005-338264 | 12/2005 |

* cited by examiner

*Primary Examiner*—David Nelms
*Assistant Examiner*—Nathanael R. Briggs
(74) *Attorney, Agent, or Firm*—K&L Gates LLP

(57) ABSTRACT

As means for providing wide viewing angle of a liquid crystal display device by changing the angle made by the alignment direction and the strip-shaped portions, a phase difference applied in the liquid crystal layer can be matched for every sub pixel area displaying each color. According to the aspect of the invention, by changing the angle made by the alignment direction of the alignment layer and the strip-shaped electrodes for every sub pixel area, the phase difference applied in the liquid crystal layer can be matched for wavelength region of displayed color in sub pixel area. Accordingly, the voltage applied between the pixel electrode and the common electrode when luminance becomes the maximum in each sub pixel area becomes equal and white display in which color is reduced can be performed.

9 Claims, 11 Drawing Sheets

LIQUID CRYSTAL DISPLAY DEVICE AND ELECTRONIC APPARATUS FOR THE REDUCTION OF COLOR IN A WHITE DISPLAY

The entire disclosure of Japanese Patent Application Nos. 2006-243742, filed Sep. 8, 2006 and 2007-198516, filed Jul. 31, 2007 are expressly incorporated by reference herein.

BACKGROUND

1. Technical Field

The present invention relates to a liquid crystal display device using a horizontal electric field driving system and to an electronic apparatus equipped with the same.

2. Related Art

As means for providing wide viewing angle of a liquid crystal display device, it has been heretofore known to use a system for performing alignment control of liquid crystal molecules by generating an electric field to an liquid crystal layer in a substrate direction (hereinafter, referred to as horizontal electric field system). As for such a horizontal electric field system, IPS (In-Plane Switching) system and FFS (Fringe-Field Switching) system have been known (for example see JP-A-2005-234527).

Generally, in the liquid crystal display device using such a horizontal electric field system, a pair of electrodes for driving the liquid crystal layer is provided at one side of a pair of substrates sandwiching the liquid crystal layer. In addition, for example, in a transmission type liquid crystal display device using a horizontal electric field system, a phase difference corresponding to ½ wavelength is applied to the light transmitted through the liquid crystal layer by applying a voltage between a pair of electrodes and generating a horizontal electric field in the liquid crystal layer. Then, in the liquid crystal display device employing normally black mode, linearly-polarized light having a predetermined polarized direction is introduced from outer surface of one of the substrate and is outputted from the other substrate after a phase difference corresponding to ½ wavelength is applied by the liquid crystal layer and after transmitted through a color filter provided on the other substrate.

However, a problem described below is remained also in the conventional liquid crystal display device. That is, in the liquid crystal display device, as described above, a phase difference corresponding to ½ wavelength is applied to the light by generating a horizontal electric field in the liquid crystal layer. Accordingly, for example, when the thickness of the liquid crystal layer is set so that a phase difference corresponding to ½ wavelength is applied to green color light, there is a case in that a phase difference corresponding to ½ wavelength may not be applied to red or blue color light due to difference between the wavelength range of green color light and the wavelength range of red or blue color light. For example, in the case of red color light, the wavelength is longer than that of green color light. Accordingly, a phase difference corresponding to larger than ½ wavelength is applied when transmitted through the liquid crystal layer. Herewith, in the sub pixel areas in which led color, green color, and blue color are respectively displayed, a voltage applied between the pair of electrodes when the luminance of the light emitted from the liquid crystal display device becomes the maximum becomes different. Accordingly, there is a problem in that the white display by the plurality of sub pixels when the same voltage is applied to the pair of the electrodes is tainted with color.

SUMMARY

An advantage of some aspects of the invention is to provide a liquid crystal display device which makes it possible to perform white display in which color is reduced and an electronic apparatus equipped with the same.

According to an aspect of the invention, there is provided a liquid crystal display device equipped with a pair of substrates sandwiching a liquid crystal layer and constituting a plurality of sub pixel areas arranged in a plane state, one of the substrates having a first electrode, a driving element connected to the first electrode, a second electrode, and an insulating layer provided between the first electrode and the second electrode, and for displaying a plurality of colors whose wavelength regions are different from the plurality of sub pixel areas by driving liquid crystal molecules constituting the liquid crystal layer by an electric field generated between the first electrode and the second electrode. One of the first and second electrodes is provided at the liquid crystal layer side than the other electrode and is equipped with a plurality of strip-shaped portions arranged so as to extend in parallel with each other with a predetermined space in the sub pixel area, and the other electrode is provided in an area including the spaces and the plurality of strip-shaped portions in the sub pixel area. An angle made by an extending direction of the strip-shaped portions and an alignment direction of the liquid crystal molecules in the initial state provided in the sub pixel area displaying a predetermined color among the plurality of colors is set larger than an angle made by an extending direction of the strip-shaped portions and the alignment direction of the liquid crystal molecules in the initial state provided in the sub pixel area displaying a color whose wavelength is relatively shorter than that of the predetermined color.

According to the aspect of the invention, by changing the angle made by the alignment direction and the strip-shaped portions, a phase difference applied in the liquid crystal layer can be matched for every sub pixel area displaying each color. Herewith, white display in which color is reduced can be performed.

That is, when a voltage is applied between the first and the second electrodes, The rotating angle of the liquid crystal molecules by the generated horizontal electric field becomes smaller as the angle made by the alignment direction in the initial state and the extending direction of the strip-shaped portions becomes larger. Then, the phase difference applied to the light introduced in to the liquid crystal layer becomes larger as the rotating angle of the liquid crystal molecules rotated by the generated horizontal electric field becomes larger. Consequently, when the angle made by the alignment direction in the initial state and the extending direction of the strip-shaped portions in the sub pixel area displaying a color whose wavelength is long is relatively set larger, the phase difference applied to the light having the long wavelength displayed in the sub pixel area in the liquid crystal layer becomes smaller even when the same voltage as the voltage applied to the sub pixel area displaying a color whose wavelength is short is applied. Herewith, when the same voltage is applied between the first and second electrode in each sub pixel area, the phase difference applied in the liquid crystal layer can be matched for every sub pixel area. Accordingly, the voltage by which the luminance in each sub pixel area becomes the maximum becomes the same, which makes it possible to perform white display in which color is reduced.

Further, it is preferable that the plurality of sub pixel areas may display red, green, and blue colors.

In this case, by combining a sub pixel area displaying red color, a sub pixel area displaying green color, and a sub pixel area displaying blue color, white display in which color is reduced is performed. At this time, the angle made by the aliment direction and the extending direction of the strip-shaped portions becomes larger in the order of the sub pixel area displaying blue color, the sub pixel area displaying green color, and the sub pixel area displaying red color.

Further, it is preferable that an angle made by an extending direction of the strip-shaped portions of the one electrode provided in the sub pixel area displaying red color and the alignment direction is set to not less than 4 degrees and not more than 10 degrees, an angle made by an extending direction of the strip-shaped portions of the one electrode provided in the sub pixel area displaying green color and the alignment direction is set to not less than 2 degrees and not more than 8 degrees, and an angle made by an extending direction of the strip-shaped portions of the one electrode provided in the sub pixel area displaying blue color and the alignment direction is set to not less than 0 degrees and not more than 6 degrees.

In this case, shortening of reddish color for white display, inviting reddish color in white display, shortening of greenish color for white display, inviting greenish color in white display, shortening of bluish color for white display, and inviting bluish color in white display can be more surely prevented by setting the angles made by the extending directions of the strip-shaped portions provided in sub pixel areas displaying red color, green color, and blue color and the alignment direction respectively to not less than 4 degrees and not more than 10 degrees, not less than 2 degrees and not more than 8 degrees, and not less than 0 degrees and not more than 6 degrees.

Herein, it is more preferable that the angle made by the extending direction of the strip-shaped portions in the sub pixel area displaying red color and the alignment direction is set to 7 degrees. Herewith, the phase difference corresponding to ½ wavelength can be applied to red color light in the liquid crystal layer. Further, it is more preferable that the angle made by the extending direction of the strip-shaped portions in the sub pixel area displaying green color and the alignment direction is set to 5 degrees. Herewith, the phase difference corresponding to ½ wavelength can be similarly applied to green color light in the liquid crystal layer. Then, it is more preferable that the angle made by the extending direction of the strip-shaped portions in the sub pixel area displaying blue color and the alignment direction is set to 3 degrees. Herewith, the phase difference corresponding to ½ wavelength can be applied to blue color light in the liquid crystal layer.

Further, it is preferable that a difference of the angle made by the extending direction of the strip-shaped portions of the one electrode provided in the sub pixel area displaying red color and the alignment direction and the angle made by the extending direction of the strip-shaped portions of the one electrode provided in the sub pixel area displaying green color and the alignment direction and a difference of the angle made by the extending direction of the strip-shaped portions of the one electrode provided in the sub pixel area displaying green color and the alignment direction and the angle made by the extending direction of the strip-shaped portions of the one electrode provided in the sub pixel area displaying blue color and the alignment direction are respectively set to 2 degrees.

In this case, the phase difference applied in the liquid crystal layer in each sub pixel area can be more surely matched by setting each angler difference to 2 degrees. Accordingly, white display in which color is further reduced can be performed.

Further, it is preferable that an angle made by an extending direction of the strip-shaped portions of the one electrode provided in the sub pixel area displaying red color and the alignment direction is set to not less than 12 degrees and not more than 17 degrees, an angle made by an extending direction of the strip-shaped portions of the one electrode provided in the sub pixel area displaying green color and the alignment direction is set to not less than 7 degrees and not more than 12 degrees, and an angle made by an extending direction of the strip-shaped portions of the one electrode provided in the sub pixel area displaying blue color and the alignment direction is set to not less than 0 degrees and not more than 5 degrees.

In this case, shortening of reddish color for white display, inviting reddish color in white display, shortening of greenish color for white display, inviting greenish color in white display, shortening of bluish color for white display, and inviting bluish color in white display can be more surely prevented by setting the angles made by the extending directions of the strip-shaped portions provided in sub pixel areas displaying red color, green color, and blue color and the alignment direction respectively to not less than 12 degrees and not more than 17 degrees, not less than 7 degrees and not more than 12 degrees, and not less than 0 degrees and not more than 5 degrees.

Herein, it is more preferable that the angle made by the extending direction of the strip-shaped portions in the sub pixel area displaying red color and the alignment direction is set to 15 degrees. Herewith, the phase difference corresponding to ½ wavelength can be applied to red color light in the liquid crystal layer. Further, it is more preferable that the angle made by the extending direction of the strip-shaped portions in the sub pixel area displaying green color and the alignment direction is set to 10 degrees. Herewith, the phase difference corresponding to ½ wavelength can be applied to green color light in the liquid crystal layer. Then, it is more preferable that the angle made by the extending direction of the strip-shaped portions in the sub pixel area displaying blue color and the alignment direction is set to 3 degrees. Herewith, the phase difference corresponding to ½ wavelength can be applied to blue color light in the liquid crystal layer.

Further it is preferable that a difference of the angle made by the extending direction of the strip-shaped portions of the one electrode provided in the sub pixel area displaying red color and the alignment direction and the angle made by the extending direction of the strip-shaped portions of the one electrode provided in the sub pixel area displaying green color and the alignment direction is set to degrees, and a difference of the angle made by the extending direction of the strip-shaped portions of the one electrode provided in the sub pixel area displaying green color and the alignment direction and the angle made by the extending direction of the strip-shaped portions of the one electrode provided in the sub pixel area displaying blue color and the alignment direction is set to 7 degrees.

In this case, by setting the difference of the angle in the sub pixel area displaying red color and the angle in the sub pixel area displaying green color to 5 degrees and the difference of the angle in the sub pixel area displaying green color and the angle in the sub pixel area displaying blue color to 7 degrees, the phase difference applied in the liquid crystal layer in each sub pixel area can be more surely matched. Accordingly, white display in which color is further reduced can be performed.

Further, it is preferable that an angle made by an extending direction of the strip-shaped portions of the one electrode provided in the sub pixel area displaying red color and the alignment direction is set to not less than 18 degrees and not more than 23 degrees, an angle made by an extending direction of the strip-shaped portions of the one electrode provided in the sub pixel area displaying green color and the alignment direction is set to not less than 13 degrees and not more than 18 degrees, and an angle made by an extending direction of the strip-shaped portions of the one electrode provided in the sub pixel area displaying blue color and the alignment direction is set to not less than 2 degrees and not more than 7 degrees.

In this case, shortening of reddish color for white display, inviting reddish color in white display, shortening of greenish color for white display, inviting greenish color in white display, shortening of bluish color for white display, and inviting bluish color in white display can be more surely prevented by setting the angles made by the extending directions of the strip-shaped portions provided in sub pixel areas displaying red color, green color, and blue color and the alignment direction respectively to not less than 18 degrees and not more than 23 degrees, not less than 13 degrees and not more than 18 degrees, and not less than 2 degrees and not more than 7 degrees.

Herein, it is more preferable that the angle made by the extending direction of the strip-shaped portions in the sub pixel area displaying red color and the alignment direction is set to 20 degrees. Herewith, the phase difference corresponding to ½ wavelength can be applied to red color light in the liquid crystal layer. Further, it is more preferable that the angle made by the extending direction of the strip-shaped portions in the sub pixel area displaying green color and the alignment direction is set to 15 degrees. Herewith, the phase difference corresponding to ½ wavelength can be applied to green color light in the liquid crystal layer. Then, it is more preferable that the angle made by the extending direction of the strip-shaped portions in the sub pixel area displaying blue color and the alignment direction is set to 5 degrees. Herewith, the phase difference corresponding to ½ wavelength can be applied to blue color light in the liquid crystal layer.

Further, it is preferable that a difference of the angle made by the extending direction of the strip-shaped portions of the one electrode provided in the sub pixel area displaying red color and the alignment direction and the angle made by the extending direction of the strip-shaped portions of the one electrode provided in the sub pixel area displaying green color and the alignment direction is set to 5 degrees, and a difference of the angle made by the extending direction of the strip-shaped portions of the one electrode provided in the sub pixel area displaying green color and the alignment direction and the angle made by the extending direction of the strip-shaped portions of the one electrode provided in the sub pixel area displaying blue color and the alignment direction is set to 11 degrees.

In this case, by setting the difference of the angle in the sub pixel area displaying red color and the angle in the sub pixel area displaying green color to 5 degrees and the difference of the angle in the sub pixel area displaying green color and the angle in the sub pixel area displaying blue color to 10 degrees, the phase difference applied in the liquid crystal layer in each sub pixel area can be more surely matched. Accordingly, white display in which color is further reduced can be performed.

Further, it is preferable that the one electrode has a connecting portion for connecting one ends of each of the plurality of strip-shaped portions to each other, and the other ends of each of the plurality of strip-shaped portions are respectively formed as an open end.

In this case, aperture ratio is improved by forming the other ends of the strip-shaped portions as open ends.

Further, the other electrode may be connected to the driving element controlling the electric field between the pair of electrodes.

In this case, one electrode not connected to the driving element is disposed close to the liquid crystal layer than the other electrode connected to the driving element.

According to another aspect of the invention, there is provided an electronic apparatus equipped with the liquid crystal display device.

According to the aspect of the invention, white display in which color is reduced can be performed as described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
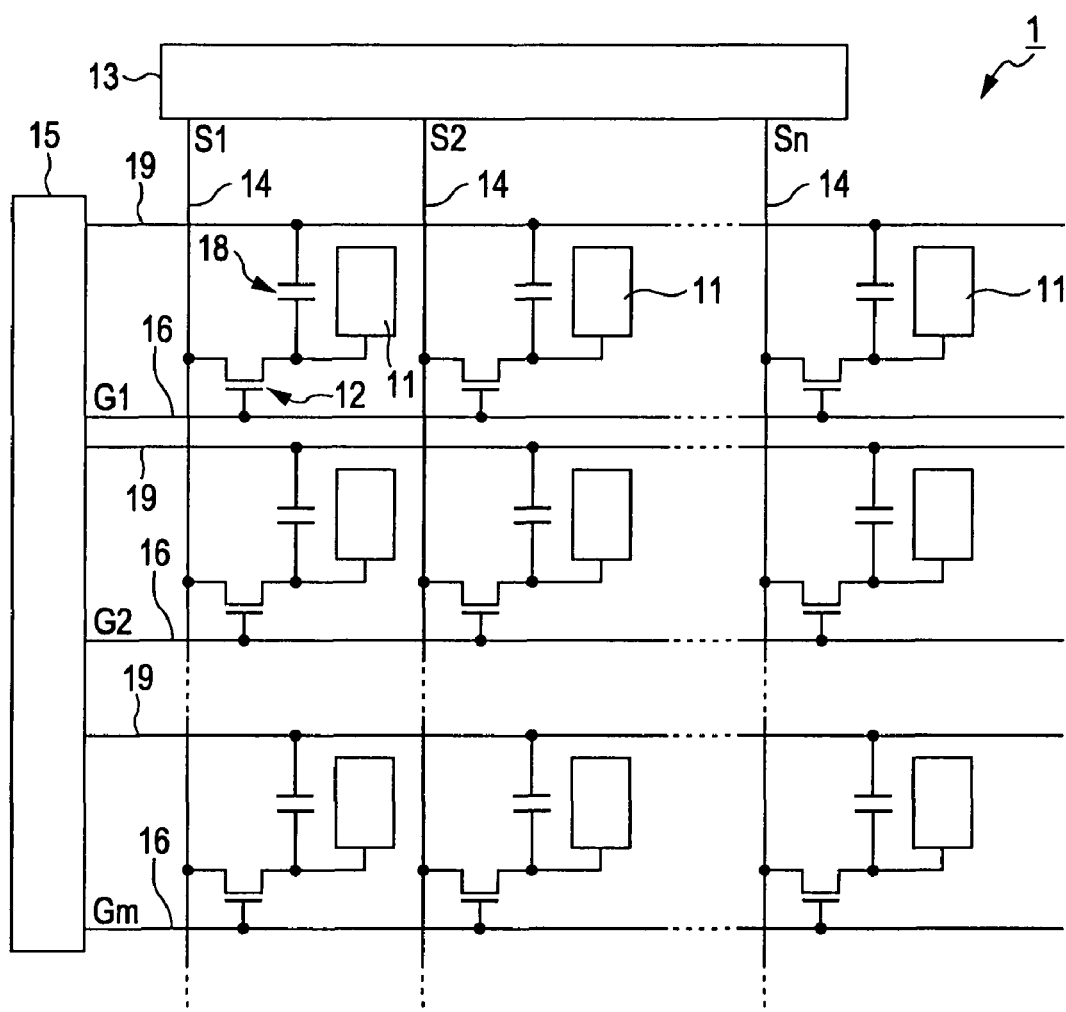
FIG. 1 is a circuit structure diagram showing a liquid crystal display device of a first embodiment.
Figure 2:
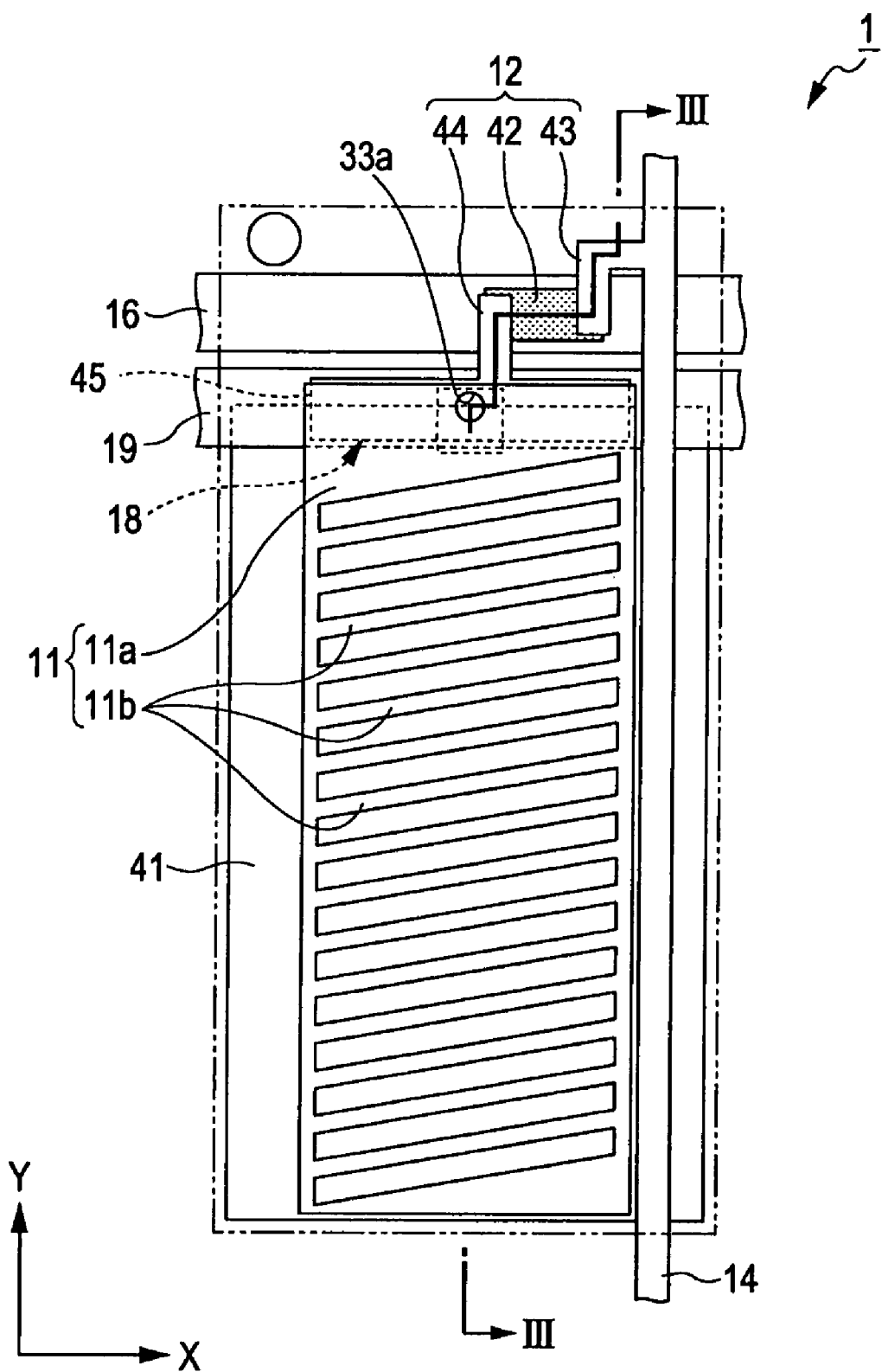
FIG. 2 is a plan block diagram showing a sub pixel area of the liquid crystal display device.
Figure 3:
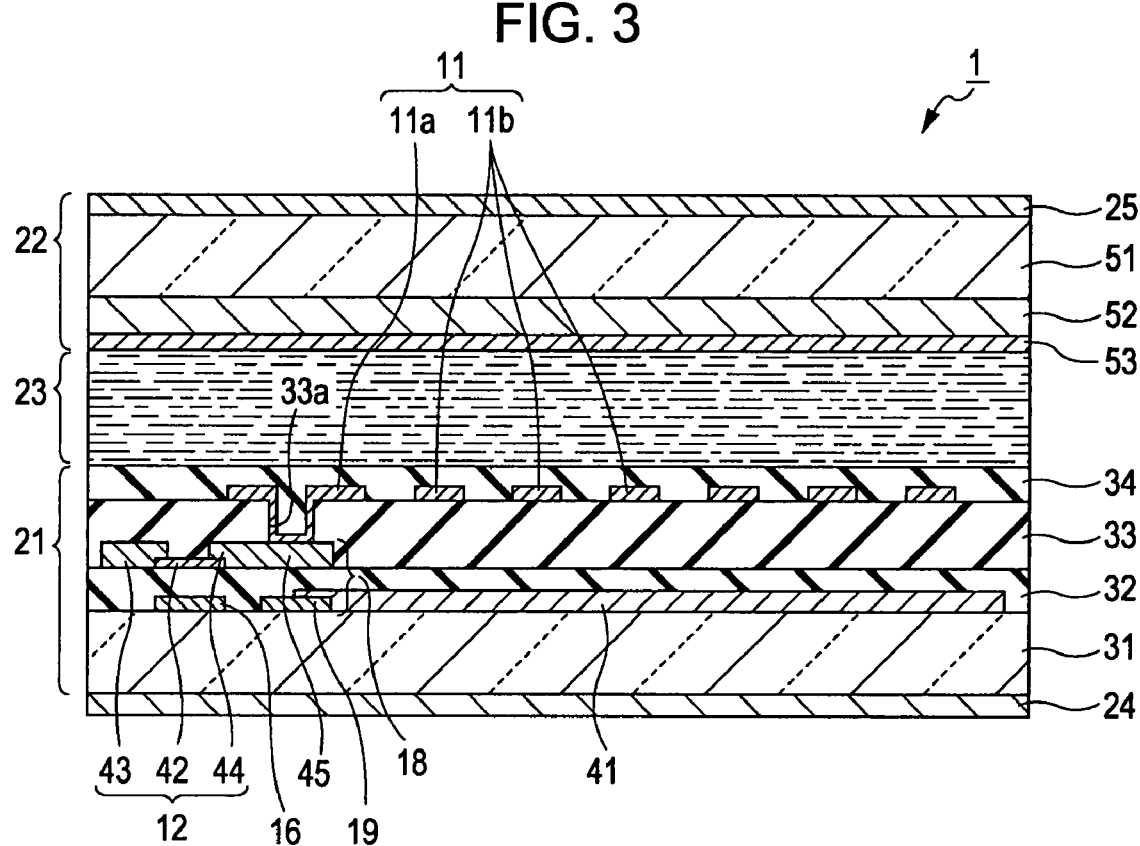
FIG. 3 is a cross sectional view taken along the line III-III of FIG. 2.
Figure 4:
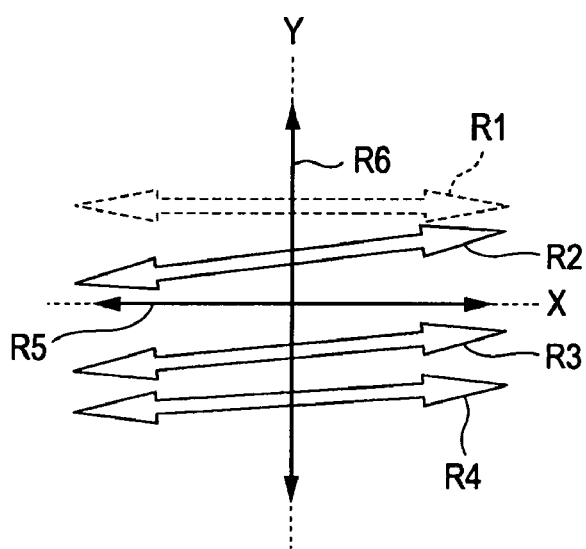
FIG. 4 is an illustration diagram showing an optical axis alignment of FIG. 2.

Hereinafter, a first embodiment of a liquid crystal display device according to the embodiment will be described based on the accompanying drawings. In each drawing used for illustrating the description described below, note that scale size is appropriately changed in order to provide an appropriate size enabling to recognize each member. Herein, FIG. 1 is an equivalent circuit diagram of a liquid crystal display device, FIG. 2 is a partially enlarged plan structure diagram showing a sub pixel area of the liquid crystal display device, FIG. 3 is a cross sectional view taken along the line III-III of FIG. 2, and FIG. 4 is a diagram showing an optical axis alignment of FIG. 2.

Liquid Crystal Display Device

An liquid crystal display device 1 according to the invention is a color liquid crystal display device using an FFS system and a liquid crystal display device constituting one pixel by three sub-pixels outputting each color light of R (red), G (green), and B (blue). Herein, a display area which becomes the smallest unit constituting display is referred to as a "sub pixel area" and a display area constituted by a set of sub pixels (R, G, B) is referred to as a "pixel area".

First, a structure of the liquid crystal display device 1 will be schematically described. In the liquid crystal display device 1, a plurality of sub pixel areas constituting a pixel display area are arranged in a matrix manner.

In addition, a pixel electrode (first electrode) 11 and a TFT (Thin Film Transistor) element 12 for switching and controlling the pixel electrode 11 are formed in each of the plurality of sub pixel areas constituting the pixel display area of the liquid crystal display device 1. The source of the TFT element 12a is connected to a data line 14 extending from a data line driving circuit 13 provided in the liquid crystal display device 1, the gate of the TFT element 12a is connected to a scanning line 16 extending from a scanning line driving circuit 15 provided in the liquid crystal display device 1, and the drain of the TFT element 12a is connected to the corresponding pixel electrode 11.

The data line driving circuit 13 is constituted so as to supply image signals S1, S2 . . . , Sn to each sub pixel area via the data lines 14. In addition, the scanning line driving circuit 15 is constituted so as to supply driving signals G1, G2 . . . , Gm to each sub pixel area via the driving lines 16. Herein, the data line driving circuit 13 may supply the image signals S1, S2 . . . , Sn in this order or may supply the image signals S1, S2 . . . , Sn for every group constituted by a plurality of mutually adjacent data lines 14. In addition, the scanning line driving circuit 15 supplies the driving signals G1, G2 . . . , Gn at predetermined timings in line sequence as pulse signals.

The liquid display device 1 is constituted so that the image signals S1, S2 . . . , Sn supplied from the data lines 14 are written into the pixel electrodes 11 at predetermined timings when the TFT elements 12 which are switching elements are set to on state for a predetermined period by input of the driving signals G1 to Gm. Then, the image signals S1, S2 . . . , Sn having predetermined levels written into liquid crystal via the pixel electrodes 11 are kept for a predetermined period between the pixel electrodes 11 and a common electrode (second electrode) 41 described below disposed via the liquid crystal. Herein, a storage capacitor 18 is provided so as to be connected in parallel with a liquid crystal capacitance formed between the pixel electrode 11 and the common electrode 14 described below in order to prevent the leakage of the kept image signals S1, S2 . . . , Sn. The storage capacitor 81 is provided between the drain of the TFT element 12 and a capacitor line 19.

Next, a detailed structure of the liquid crystal display device 1 will be described with reference to FIG. 2 and FIG. 3. Note that a counter substrate is omitted in FIG. 2. Further, strip-shaped electrodes constituting the pixel electrode are appropriately omitted in FIG. 3.

As shown in FIG. 3, the liquid crystal display device 1 is equipped with an element substrate 21 (one substrate), a counter substrate (the other substrate) 22 oppositely disposed to the element substrate 21, a liquid crystal layer 23 sandwiched between the element substrate 21 and the counter substrate 22, a polarizer 24 provided on the outer surface side of the element substrate 21 (opposite side to the liquid crystal layer 23), and a polarizer 25 provide on the outer surface side of the counter substrate 22. The liquid crystal display device 1 has a structure in which illumination light is emitted from the outer surface side of the element substrate 21.

In addition, a sealing member (omitted in FIG. 3) is provided along edges of the area in which the element substrate 21 and the counter substrate 22 are opposed. The liquid crystal layer 23 is sealed by the sealing member, the element substrate 21, and the counter substrate 22.

The element substrate 21 is equipped with a substrate main body 31 formed by a translucent material, for example, such as glass, quartz, or plastic, and a gate insulating film (insulating layer) 32, an interlayer insulating film (insulating layer) 33, and an alignment layer 34 sequentially laminated on the inner surface (liquid crystal layer 23 side) of the substrate main body 31.

In addition, the element substrate 21 is equipped with the scanning line 16, the capacitor line 19, and the common electrode 41 disposed on the inner surface of the substrate main body 31, the data line 14 (see FIG. 2), a semiconductor layer 42, a source electrode 43, a drain electrode 44, and a capacitor electrode 45 disposed on the inner surface of the gate insulating film 32, and the pixel electrode 11 disposed on the inner surface of the interlayer insulation film 33.

The gate insulating film 32 is constituted by a translucent material having insulating property such as nitride silicon or oxide silicon and is provided so as to cover the scanning line 16, the capacitor line 19, and the common electrode 41 formed on the substrate main body 31.

The interlayer insulating film 33 is constituted by a translucent material having insulation property such as nitride silicon or oxide silicon similarly to the gate insulating film 32 and is provided so as to cover the semiconductor layer 42, the source electrode 43, the drain electrode 44, and the capacitor electrode 45 formed on the gate insulating film 32. Then, a contact hole 33a which is a through hole for providing conduction between the pixel electrode 11 and the TFT element 12 is formed at the portion of the interlayer insulating film 33 where a frame portion 11a describe below of the pixel electrode 11 and the capacitor electrode 45 are overlapped in plan view.

The alignment layer 34 is constituted by an organic material such as, for example, polyimide and provided so as to cover the pixel electrode 11 formed on the interlayer insulating film 33.

The upper surface of the alignment layer 34 is subjected to an alignment process for regulating the alignment of the liquid crystal molecules constituting the liquid crystal layer 23. The alignment direction of the alignment layer 34 is to be the same direction as the X axis (the direction along the scanning line 16 or the capacitor line 19) as shown by arrow R1 in FIG. 4. That is, the alignment direction of the alignment layer 34 is to be the same direction regardless of the color displayed in the sub pixel area. Accordingly, alignment process can be easily subjected to the alignment layer 34.

As shown in FIG. 2, the data line 14 extends in the Y axis direction (the direction approximately perpendicular to the scanning line 16), and the scanning line 16 and the capacitor line 19 extend in the X axis direction. Accordingly, the data line 14, the scanning line 16, and the capacitor line 19 are wired in an approximately grid-like pattern in plan view.

The semiconductor layer 42 is constituted by a semiconductor such as amorphous silicon partially formed at an area overlapped with the scanning line 16 in plan view. In addition, as shown in FIG. 2, the source electrode 43 is a wiring having an almost inverse L shape in plan view and is brunched from the data line 14 and conductively connected with the semiconductor layer 42. Then, the −Y side edge of the drain electrode 44 shown in FIG. 2 is conductively connected with a connecting wiring extending along the side edge of the sub pixel area and the drain electrode 44 is conductively connected with the capacitor electrode 45 formed at an edge of the sub pixel area opposing the drain electrode 44 via the connecting wiring. The TFT element 12 is constituted by the semiconductor layer 42, the source electrode 43, and the drain electrode 44. Accordingly, the TFT element 12 is provided near the crossing portion of the data line 14 and the scanning line 16.

The capacitor electrode 45 has an approximately rectangular shape in plan view and is formed so as to be overlapped with the capacitor line 19 in plan view and so as to be overlapped with an edge of the frame portion 11a of the pixel electrode 11 at +Y side shown in FIG. 2 in plan view. Then, the capacitor electrode 45 is conductively connected to the pixel electrode 11 via the contact hole 33a provided at a position overlapped with an edge of the frame portion 11a at +Y side in plan view and passing through the interlayer insulating film 33. The storage capacitor 18 is formed by the capacitor electrode 45 and the capacitor line 19.

The pixel electrode 11 has an approximately ladder shape in plan view and constituted by a translucent electrical conducting material, for example, such as ITO (indium tin oxide). Then, the pixel electrode 11 is equipped with the frame portion 11a having a rectangular frame shape in plan view and a plurality of strip-shaped electrodes (strip-shaped portions) 11b (15 electrodes) extending approximately in the X axis direction (obliquely extending to the scanning line 16 to have a predetermined angle) and disposed so as to be in parallel to each other with a distance in the Y axis direction (longitudinal direction of sub pixel area).

The both ends of each of the strip-shaped electrodes 11b are respectively connected with the frame portion 11a at portions extending in the Y axis direction and the strip-shaped electrodes 11b are conductively connected to each other. Herein, the extending direction of the strip-shaped electrodes 11b in the sub pixel area displaying red color is set to the direction shown by the arrow R2 in FIG. 4, that is, the angle made with the alignment direction (R1 direction) of the alignment layer 34 which is the alignment direction of the liquid crystal molecules in the initial state is set to 7 degrees. In addition, the extending direction of the strip-shaped electrodes 11b in the sub pixel area displaying green color is set to the direction shown by the arrow R3 in FIG. 4, that is, the angle made with the alignment direction of the alignment layer 34 is set to 5 degrees. Then, the extending direction of the strip-shaped electrodes 11b in the sub pixel area displaying blue color is set to the direction shown by the arrow R4 in FIG. 4, that is, the angle made with the alignment direction of the alignment layer 34 is set to 3 degrees.

That is, the angle made by the extending direction of the strip-shaped electrodes 11b and the alignment direction of the alignment layer 34 is set larger as the wavelength of the color displayed in the sub pixel area in which the strip-shaped electrodes 11b are provided becomes longer. In addition, adjustment of the angle made by the extending direction of the strip-shaped electrodes 11b and the alignment direction of the alignment layer 34 in each sub pixel area is performed by changing the extending direction of the strip-shaped electrodes 11b.

As shown in FIG. 2 in plan view, the common electrode 41 is provided at an area overlapped with the plurality of strip-shaped electrodes 11b and the spaces between the strip-shaped electrodes 11b in the sub pixel area, and is constituted by a translucent electrical conducting material, for example, such as ITO similarly to the pixel electrode 11. Then, the common electrode 41 is disposed at the side (in the embodiment, between the pixel electrode 11 and the substrate main body 31) apart from the liquid crystal layer 23 than the pixel electrode 11.

That is, the gate insulating film 32 and the interlaying insulating film 33 constituting an insulating layer are disposed between the pixel electrode 11 and the common electrode. In addition, the interval of the strip-shaped electrodes 11b constituting the pixel electrode 11 is set smaller than the electrode width of the strip-shaped electrodes 11b and the layer thickness of the liquid crystal layer 23. Herewith, the pixel electrode 11 and the common electrode 41 constitute an electrode structure of an FFS system.

As shown in FIG. 3, the counter substrate 22 is equipped with a substrate main body 51 constituted by a translucent member such as, for example, glass, quartz, and plastic, and a color filter layer 52 and a alignment film 53 sequentially laminated on the inner surface (liquid crystal layer 23 side) of the substrate main body 51.

The color filter layer 52 is disposed so as to correspond with the sub pixel area, is constituted by, for example, such as acrylic, and includes a color material corresponding to the color displayed on each sub pixel area.

The alignment layer 53 is constituted by, for example, an organic material such as polyimide or an inorganic material such as silicon oxide, and the alignment direction thereof is set to the same direction (but reverse direction) as the alignment direction of the alignment layer 34.

The thickness of the liquid crystal layer 23 is nearly set so that the phase difference corresponding to ½ wavelength is applied to the green light transmitted through the liquid crystal layer 23.

The polarizer 24 and the polarizer 25 are provided so that the transmission axes thereof are set perpendicular to each other. That is, the transmission axis of the polarizer 24 is set to the Y axis direction as shown by the arrow R5 and the transmission axis of the polarizer 25 is set to the X axis direction as shown by the arrow R6 in FIG. 4.

Operation of Liquid Crystal Display Device

Subsequently, an operation of the liquid crystal display device 1 having the structure will be described.

The liquid crystal display device 1 in the embodiment is a liquid crystal display device of a horizontal electric field driving system using an FFS system and generates an electric field between the pixel electrode 11 and the common electrode 41 in the substrates surface direction and drives liquid crystal by the electric field by supplying an image signal (voltage) to the pixel electrode 11 via the TFT element 12. Then, the liquid crystal display device 1 performs display by changing the transmittance for every sub pixel area. Note that, a predetermined constant electrical potential for use in driving of the liquid crystal layer or 0 V shall be applied to the common electrode 41 or a signal in which a predetermined constant electrical potential and another predetermined constant electrical potential different therefrom are periodically switched (for every frame period or field period) shall be applied to the common electrode 41.

That is, the liquid crystal molecules constituting the liquid crystal layer 23 are aligned in the horizontal direction shown by the arrow R1 of FIG. 4 when no voltage is applied to the pixel electrode 11. Then, when an electric field is generated in the liquid crystal layer 23 along the direction perpendicular to the extending direction of the strip-shaped electrodes 11b constituting the pixel electrode 11 via the pixel electrode 11 and the common electrode 41, the liquid crystal molecules are aligned along the direction.

In the liquid crystal display device 1, illumination light is changed into linearly-polarized light polarized along the transmission axis of the polarizer 24 by transmitted through the polarizer 24 to be introduced into the liquid crystal layer 23.

Then, when the liquid crystal layer 23 is in off state (non selected state), the linearly-polarized light introduced into the liquid crystal layer 23 is emitted from the liquid crystal layer 23 with the same polarized light state as that when introduced. The linearly-polarized light is absorbed by the polarizer 25 having the transmission axis perpendicular to the linearly-polarized light. Accordingly, the sub pixel area is darkly displayed.

On the other hand, when the liquid crystal layer 23 is in on state (selected state), a predetermined phase difference (½ wavelength) is provided to the linearly-polarized light introduced into the liquid crystal layer 23 by the liquid crystal layer 23, and the linearly-polarized light is converted into the linearly-polarized light rotated by 90 degrees from the polarization direction when introduced. The linearly-polarized light is in parallel with the transmission axis of the polarizer 25, so that the linearly-polarized light is transmitted through the polarizer 25 and is viewed as display light. Accordingly, the sub pixel area is brightly displayed.

As described above, the liquid crystal display device 1 of the embodiment is to be a liquid crystal display device using normally black-displaying mode in which dark is displayed in off state.

Here, the phase difference applied in the liquid crystal layer 23 in on state will be described.

First, when a voltage is applied between the pixel electrode 11 and the common electrode 41, liquid crystal molecules are aligned along the direction perpendicular to the extending direction of the polarity of strip-shaped electrodes 11b. Consequently, a phase difference is applied to the light introduced into the liquid crystal layer 23. Herein, the applied phase difference becomes smaller as the wavelength becomes shorter. Accordingly, the phase differences applied to the wavelength of red light, the wavelength of green light, and the wavelength of blue light becomes smaller in this order.

In addition, the phase difference applied in the liquid crystal layer 23 becomes larger as the rotating angle of the liquid crystal molecules becomes larger by the horizontal electric field. Herein, as described above, the generated direction of the horizontal electric field is approximately the same direction as the alignment direction of the plurality of strip-shaped electrodes 11b, so that the horizontal electric field is generated in the direction perpendicular to the extending direction of the strip-shaped electrodes 11b. Accordingly, the phase difference applied in the liquid crystal layer 23 becomes smaller as the angle made by the extending direction and the alignment direction in the initial state becomes larger.

At this time, in the sub pixel area displaying green color, the phase difference corresponding to ½ wavelength is applied to green color light among the linearly-polarized light introduced into the liquid crystal layer 23 by setting the angle made by the extending direction of the strip-shaped electrodes 11b and the alignment direction of the alignment layer 34 to 5 degrees. Then, a phase difference corresponding to larger than ½ wavelength is applied to the light having a wavelength range longer than green color light, and a phase difference corresponding to smaller than ½ wavelength is applied to the light having a wavelength range shorter than green color light.

Further, in the sub pixel area displaying red color, the angle made by the extending direction of the strip-shaped electrodes 11b and the alignment direction of the alignment layer 34 is set to 7 degrees larger by 2 degrees than that in the sub pixel area displaying green color. Accordingly, in the sub pixel area displaying red color, the phase difference applied in the liquid crystal layer 23 becomes smaller as compared with the sub pixel area displaying green color. Herewith, the phase difference corresponding to ½ wavelength is applied to red color light. Then, a phase difference corresponding to larger than ½ wavelength is applied to the light having a wavelength range longer than red color light, and a phase difference corresponding to smaller than ½ wavelength is applied to the light having a wavelength range shorter than red color light.

Then, in the sub pixel area displaying blue color, the angle made by the extending direction of the strip-shaped electrodes 11b and the alignment direction of the alignment layer 34 is set to 3 degrees smaller by 2 degrees than that in the sub pixel area displaying green color. Accordingly the phase difference corresponding to ½ wavelength is similarly applied to blue light. Then, a phase difference corresponding to larger than ½ wavelength is applied to the light having a wavelength range longer than blue color light, and a phase difference corresponding to smaller than ½ wavelength is applied to the light having a wavelength range shorter than blue color light.

Note that the angle made by the extending direction of the strip-shaped electrodes 11b and the alignment direction of the alignment layer 34 shows the angle made by the center line of the strip-shaped electrode 11b at the center portion in the length direction and the alignment direction of the alignment layer 34.

As described above, the phase difference corresponding to ½ wavelength is applied to the wavelength region of displayed color in each sub pixel area. Accordingly, the voltage applied between the pixel electrode 11 and the common electrode 41 when luminance of the light becomes the maximum is matched in each sub pixel area. Herewith, white hardly tainted with color is displayed.

Herein, a relation between a voltage applied between the pixel electrode 11 and the common electrode 41 and intensity of the light emitted from the counter substrate 22 will be described in FIG. 5. Note that comparative luminance when the maximum value of the luminance for displaying green color is set to 1 is shown in FIG. 5.

Figure 5:
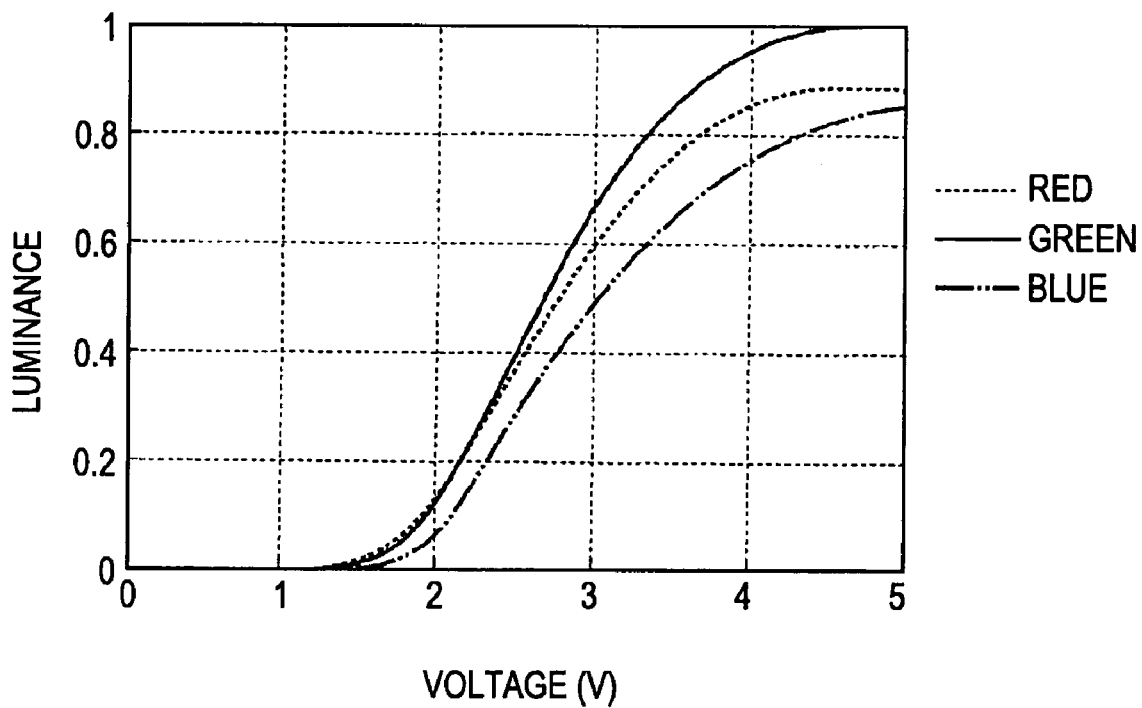
FIG. 5 is a graph showing a relation between applied voltage and luminance in each sub pixel area.

As shown in FIG. 5, it is recognized that the voltage value applied when luminance becomes the maximum can be matched for each color by adjusting the angle made by the extending direction of the strip-shaped electrodes 11b and the alignment direction of the alignment film 34 for every sub pixel area. Herewith, white display in which color is reduced can be performed when the same voltage is applied.

Electronic Apparatus

Next, an electronic apparatus equipped with the liquid crystal display device 1 having the above described structure will be described. Herein, FIG. 6 is an appearance perspective view showing a mobile phone 100 which is an electronic apparatus equipped with the liquid crystal display device of the invention.

Figure 6:
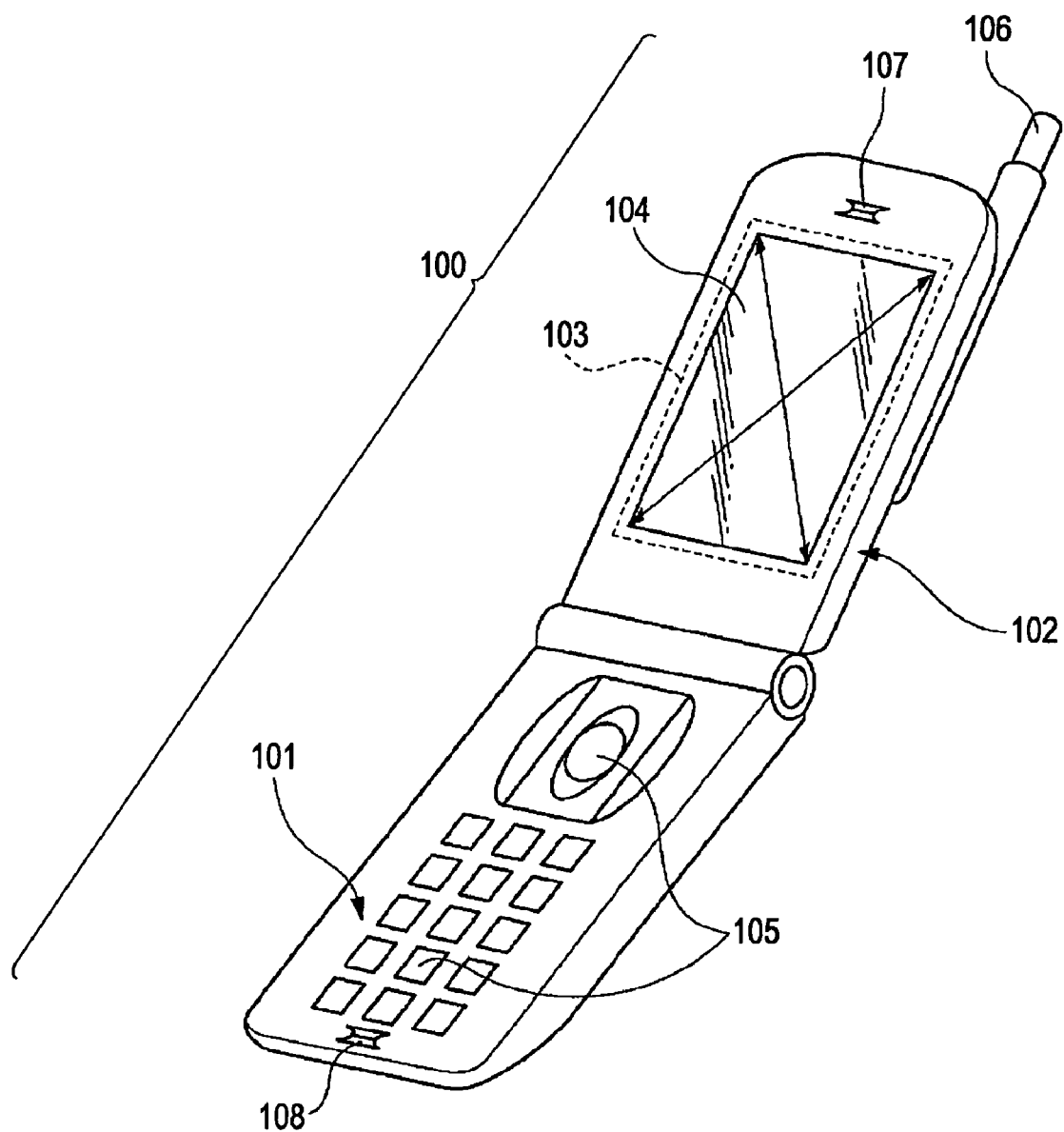
FIG. 6 is an appearance perspective view showing a mobile phone of the invention.

The electronic apparatus of the embodiment is a mobile phone 100 as shown in FIG. 6 and includes a main body unit 101 and a display body unit 102 provided thereto so as to be able to be opened and closed. A display device 103 is disposed in the display body unit 102 and various indications related to telephone communication can be viewed on a display screen 104. In addition, operation buttons 105 are arranged on the main body unit 101.

Then, an antenna 106 is attached to an end of the display body unit 102 so as to be freely pulled out and pushed back. Further, a speaker (not shown) is incorporated in an earpiece unit 107 provided on an upper portion of the display body unit 102. Further, a microphone (not shown) is incorporated in a mouthpiece unit 108 provided at a lower portion of the main body unit 101.

Herein, the liquid crystal display device 1 shown in FIG. 1 is used for the display device 103.

As described above, according to the liquid crystal display device 1 of the embodiment and the mobile phone 100 equipped therewith, by changing the angle made by the alignment direction of the alignment layer 34 and the strip-shaped electrodes 11b for every sub pixel area, the phase difference applied in the liquid crystal layer 23 can be matched for wavelength region of displayed color in sub pixel area. Accordingly, the voltage applied between the pixel electrode 11 and the common electrode 41 when luminance becomes the maximum in each sub pixel area becomes equal and white display in which color is reduced can be performed.

Further, in the sub pixel area displaying red color, shortening of reddish color for white display and inviting reddish color in white display can be more surely prevented by setting the angle made by the extending direction of the strip-shaped electrodes 11b and the alignment direction to 7 degrees which is not less than 4 degrees and not more than 10 degrees. Similarly, in the sub pixel area displaying green color, shortening of greenish color for white display and inviting greenish color in white display can be more surely prevented by setting the angle to 5 degrees which is not less than 2 degrees and not more than 8 degrees. Then, in the sub pixel area displaying blue color, shortening of bluish color for white display and inviting bluish color in white display can be more surely prevented by setting the angle to 3 degrees which is not less than 0 degrees and not more than 6 degrees.

Then, the angle made by the extending direction of the strip-shaped electrodes 11b and the alignment direction of the alignment layer 34 is set to be different without changing the alignment direction of the alignment layer 34, so that alignment processing subjected to the alignment layer 34 can be easily performed.

Second Embodiment

Next, a second embodiment of the liquid crystal display device according to the invention will be described based on FIG. 7. Note that a structure of a pixel electrode of the embodiment is different from that of the first embodiment, so that this point will be mainly described and the same reference numerals are used to denote the same elements and description thereof will be omitted. Herein, FIG. 7 is a partially enlarged plan block diagram showing a sub pixel area of the liquid crystal display device.

Figure 7:
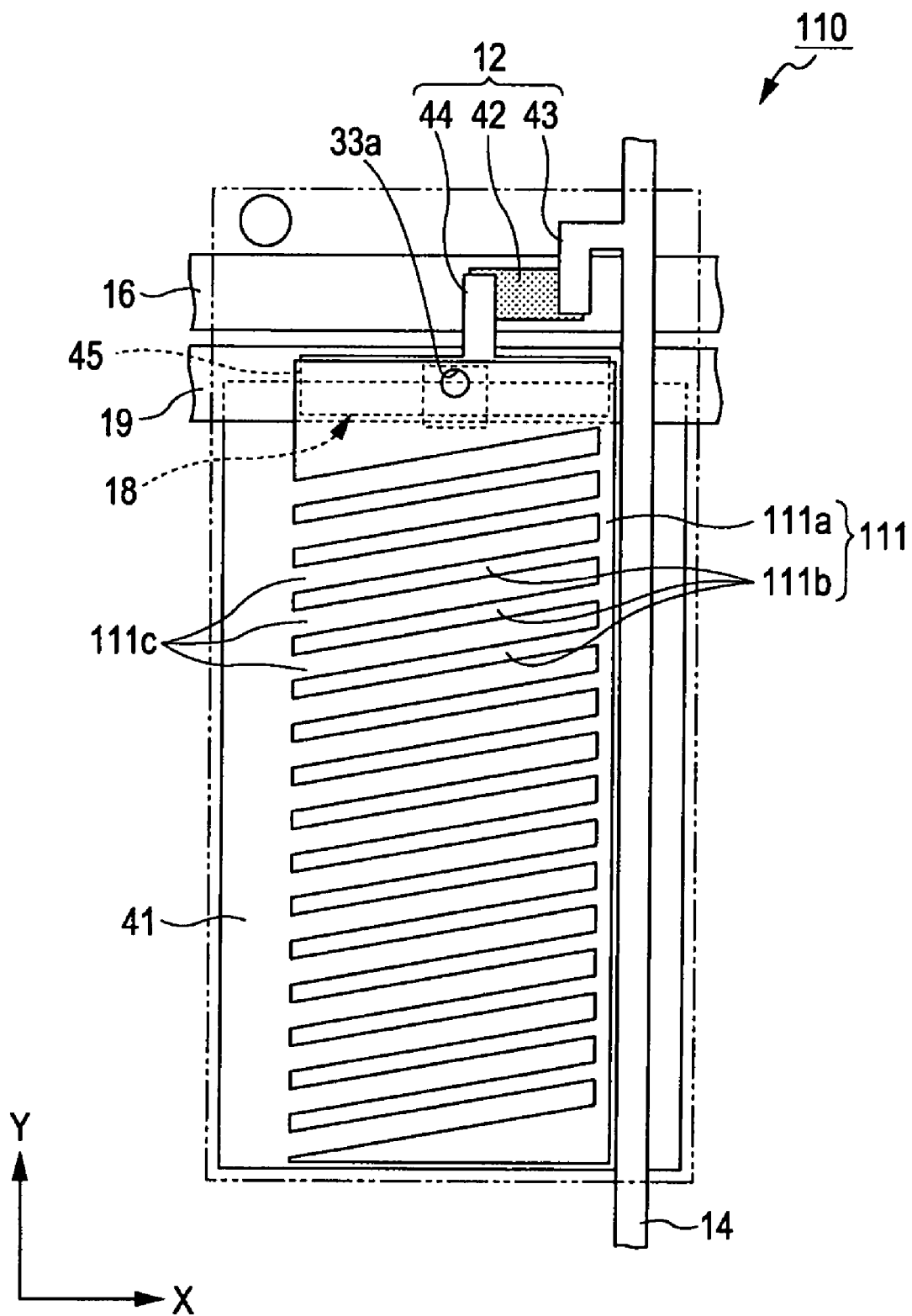
FIG. 7 is a plan block diagram showing a sub pixel area of a liquid crystal display device according to a second embodiment.

A pixel electrode 111 has an approximately comb-like shape in plan view in a liquid crystal display device 110 according to the embodiment as shown in FIG. 7. That is, the pixel electrode 111 is equipped with a connecting portion 111a and a plurality of strip-shaped electrodes 111b (15 electrodes) separated from the connecting portion 111a and disposed so as to be in parallel with each other.

The connecting portion 111a is formed near the data line 14 and disposed approximately along the Y axis direction.

The strip-shaped electrodes 111b are extended along approximately the X axis direction and disposed with a space in the Y axis direction. Herein, the edge of each strip-shaped electrode 111b at the side near the data line 14 is connected with the connecting portion 111a, and the edge of each strip-shaped electrode 111b at the side apart from the data line 14 is formed as an open end. Accordingly, the sides of the gaps formed between the plurality of strip-shaped electrodes 111b apart from the data line 14 are formed as open ends 111c opened toward the other sub pixel area adjacent to –X side.

Herein, the angle made by the extending direction of each of the strip-shaped electrodes 111b and the alignment direction of the alignment layer (not shown) which is the alignment direction of the liquid crystal molecules in the initial state in the sub pixel area displaying red color is set to 7 degrees. Further, the angle made by the extending direction of each of the strip-shaped electrodes 111b and the alignment direction of the alignment layer in the sub pixel area displaying green color is set to 5 degrees. Then, the angle made by the extending direction of each of the strip-shaped electrodes 111b and the alignment direction of the alignment layer in the sub pixel area displaying blue color is set to 3 degrees.

The same operation and effect can be obtained also in the liquid crystal display device 110 having the above structure. In addition, aperture ratio is improved by setting one ends of the strip-shaped electrodes 111b as open ends. In the embodiment, one ends apart from the data line 14 side are set as open ends. However, note that the one ends close to the data line 14 side may be formed as open ends.

Third Embodiment

Next, a third embodiment of the liquid crystal display device according to the invention will be described with reference to FIGS. 8 and 9. Note that a structure of a pixel electrode of the embodiment is different from that of the first embodiment, so that this point will be mainly described, and the same reference numerals are used to denote the same elements and description thereof will be omitted. Herein, FIG. 8 is a partially enlarged plan block diagram showing a sub pixel area of the liquid crystal display device.

Figure 8:
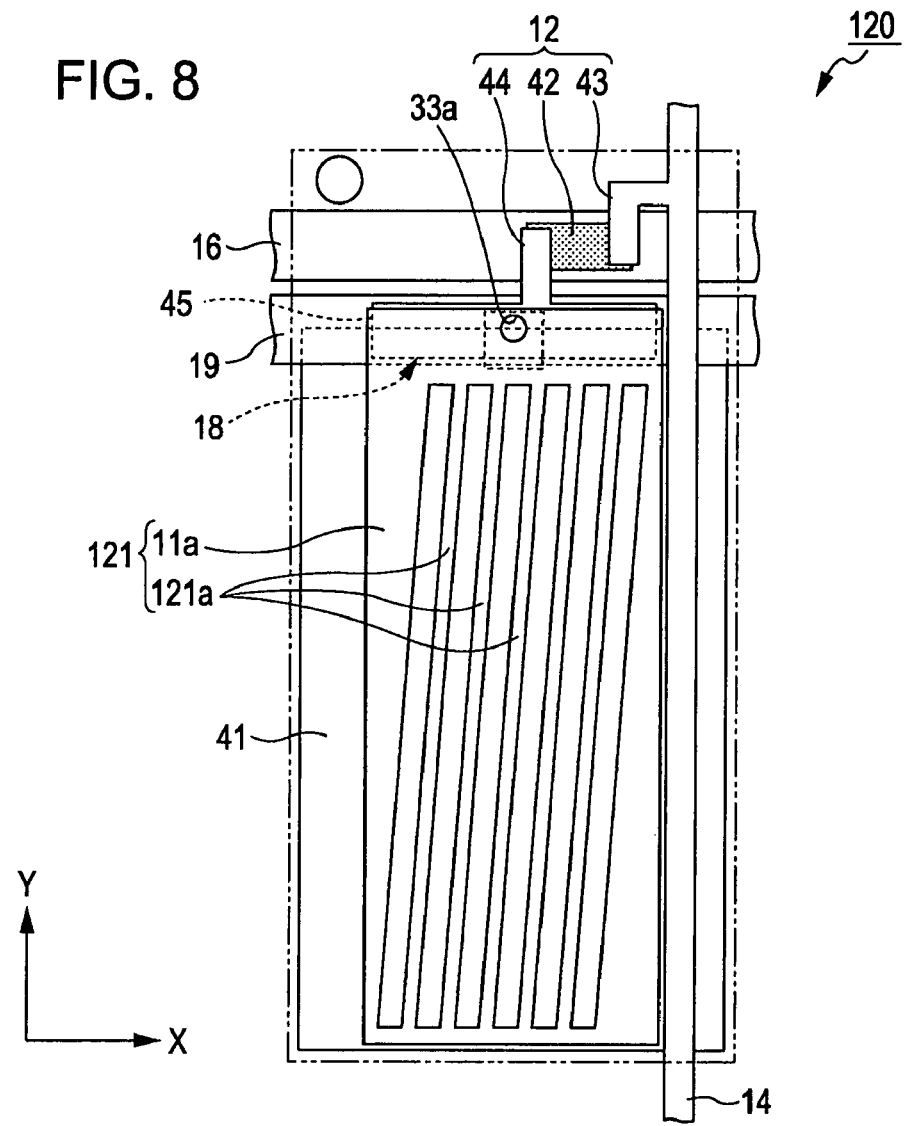
FIG. 8 is a plan block diagram showing a sub pixel area of a liquid crystal display device according to a third embodiment.

In a liquid crystal display device 120 of the embodiment, as shown in FIG. 8, a pixel electrode 121 is equipped with a frame portion 11a and a plurality of strip-shaped electrodes 121a extending in approximately the Y axis direction (obliquely extending to the data line 14 to have a predetermined angle) and disposed so as to be in parallel with each other with a space in the X axis direction (short axis direction of sub pixel area). The both ends of each of the strip-shaped electrodes 121a are respectively connected with the frame 11a at portions extending in the X axis direction and are conductively connected to each other.

Figure 9:
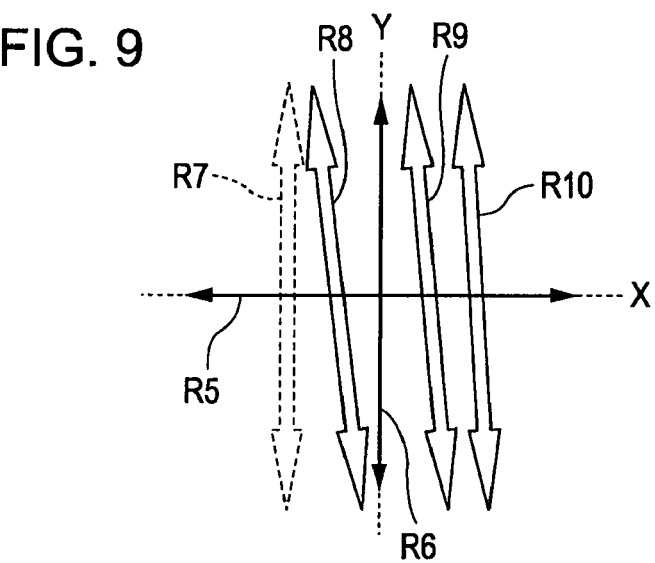
FIG. 9 is an illustration diagram showing an optical axis alignment of FIG. 8.

Note that the alignment direction of the alignment layer (omitted in FIG. 8) covering the strip-shaped electrodes 121a is set in the direction shown by the arrow R7 in FIG. 9. Further, the alignment direction of the alignment layer (omitted in FIG. 8) provided on the counter substrate (omitted in FIG. 8) is set in the same direction (but reverse direction) as the alignment direction of the alignment layer covering the strip-shaped electrodes 121a.

Herein, the angle made by the extending direction of the strip-shaped electrodes 121a and the direction shown by the arrow R8 in FIG. 9 which is the alignment direction of the alignment layer in the sub pixel area displaying red color is set to 7 degrees. In addition, the angle made by the extending direction of the strip-shaped electrodes 121a and the direction shown by the arrow R9 in FIG. 9 which is the alignment direction of the alignment layer in the sub pixel area displaying green color is set to 5 degrees. Then, the angle made by the extending direction of the strip-shaped electrodes 121a and the direction shown by the arrow R10 in FIG. 9 which is the alignment direction of the alignment layer in the sub pixel area displaying blue color is set to 3 degrees.

The same operation and effect can be obtained also in the liquid crystal display device 120 having the above structure.

Note that the one ends of the strip-shaped electrodes 121a may be formed as open ends similarly to the second embodiment.

Fourth Embodiment

Next, a fourth embodiment of the liquid crystal display device according to the invention will be described with reference to FIG. 10. Note that a structure of a pixel electrode of the embodiment is different from that of the first embodiment, so that this point will be mainly described, and the same reference numerals are used to denote the same elements and description thereof will be omitted. Herein, FIG. 10 is a partially enlarged plan block diagram showing a sub pixel area of the liquid crystal display device.

Figure 10:
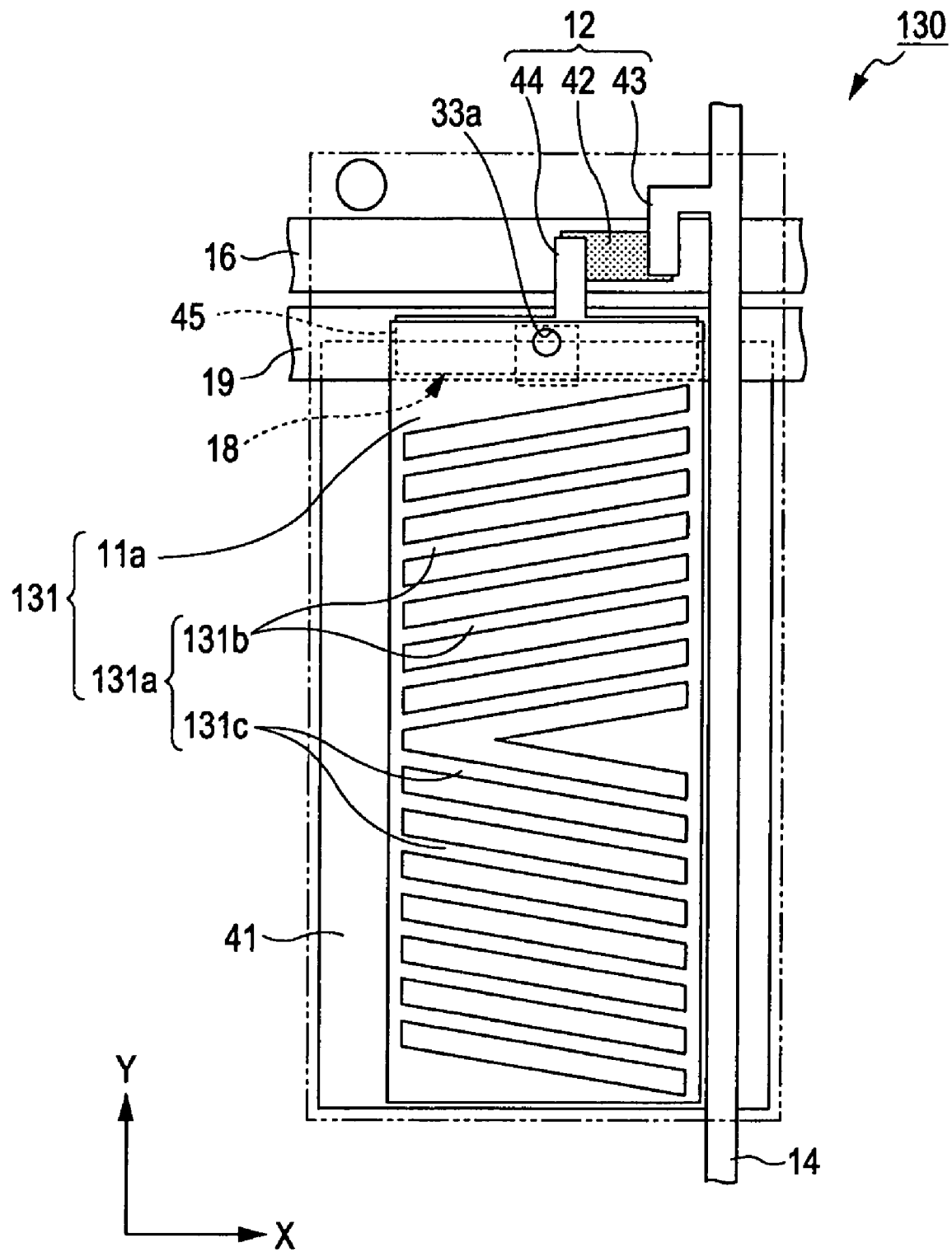
FIG. 10 is a plan block diagram showing a sub pixel area of a liquid crystal display device according to a fourth embodiment.

In a liquid crystal display device 130 of the embodiment, as shown in FIG. 10, a pixel electrode 131 has a multi drain structure. That is, the extending direction of strip-shaped electrodes 131a constituting the pixel electrode 131 in the half area positioned at the side close to the scanning line 16 of the sub pixel area is different from the extending direction of that in the half area positioned at the side apart from the scanning line 16 of the sub pixel area.

Strip-shaped electrodes 131b formed in the half side area close to the scanning line 16 among the plurality of the strip-shaped electrodes 131a extend so as to be apart from the scanning line 16 as are apart from the data line 14. In addition, strip-shaped electrodes 131c formed in the half side area apart form the scanning line 16 among the plurality of the strip-shaped electrodes 131a extend so as to be close to the scanning line 16 as are apart from the data line 14.

Herein, the angle made by the extending direction of the strip-shaped electrodes 131b and the alignment direction of the alignment layer (omitted in FIG. 10) which is the alignment direction of the liquid crystal molecules in the initial alignment state in the sub pixel area displaying red color is set to 7 degrees. In addition, the angle made by the extending direction of the strip-shaped electrodes 131b and the alignment direction of the alignment layer in the sub pixel area displaying green color is set to 5 degrees. Then, the angle made by the extending direction of the strip-shaped electrodes 131b and the alignment direction of the alignment layer in the sub pixel area displaying blue color is set to 3 degrees.

Similarly, the angle made by the extending direction of the strip-shaped electrodes 131c and the alignment direction of the alignment layer (omitted in FIG. 10) which is the alignment direction of the liquid crystal molecules in the initial alignment state in the sub pixel area displaying red color is set to 7 degrees. In addition, the angle made by the extending direction of the strip-shaped electrodes 131c and the alignment direction of the alignment layer in the sub pixel area displaying green color is set to 5 degrees. Then, the angle made by the extending direction of the strip-shaped electrodes 131c and the alignment direction of the alignment layer in the sub pixel area displaying blue color is set to 3 degrees. Note that the extending direction of the strip-shaped electrodes 131b and the extending direction of the strip shaped electrodes 131c are arranged in line symmetry with respect to the alignment direction of the alignment layer as a standard.

The same operation and effect can be obtained also in the liquid crystal display device 130 having the above structure. Note that one ends of the strip-shaped electrodes 131a and 131c may be formed as open ends and the extending directions of the strip-shaped electrodes 131b and 131c may be set in approximately the Y axis direction (oblique direction having a predetermined angle to the data line 14) similarly to the embodiments.

Fifth Embodiment

Next, a fifth embodiment of the liquid crystal display device according to the invention will be described with reference to FIGS. 11 and 12. Note that the structure of a pixel electrode of the embodiment is different from that of the first embodiment, so that this point will be mainly described, and the same reference numerals are used to denote the same elements and description thereof will be omitted. Herein, FIG. 11 is a partially enlarged plan block diagram showing a sub pixel area of the liquid crystal display device, and FIG. 12 is a cross sectional view taken along the line XII-XII of FIG. 11.

Figure 11:
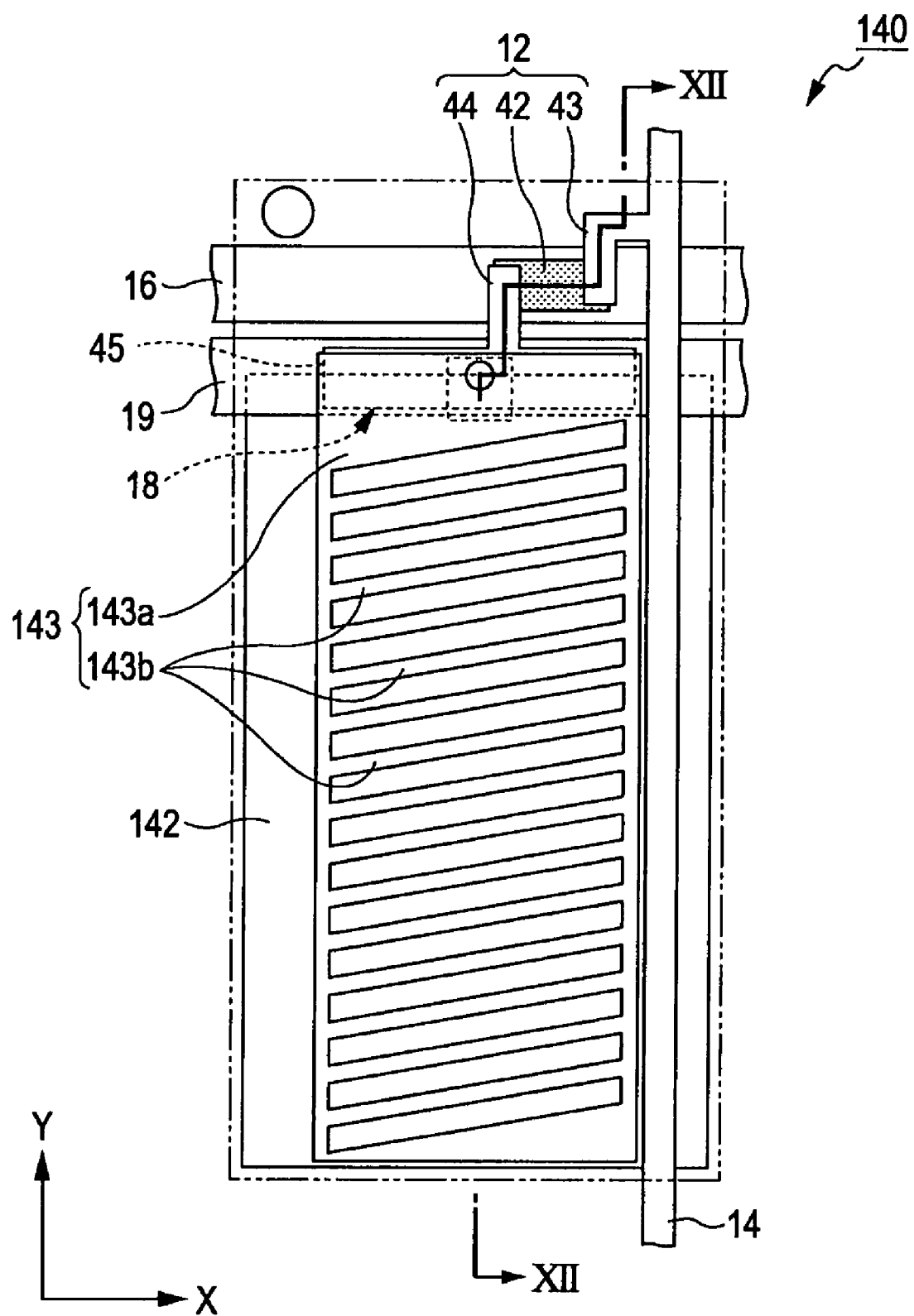
FIG. 11 is a plan block diagram showing a sub pixel area of a liquid crystal display device according to a fifth embodiment.
Figure 12:
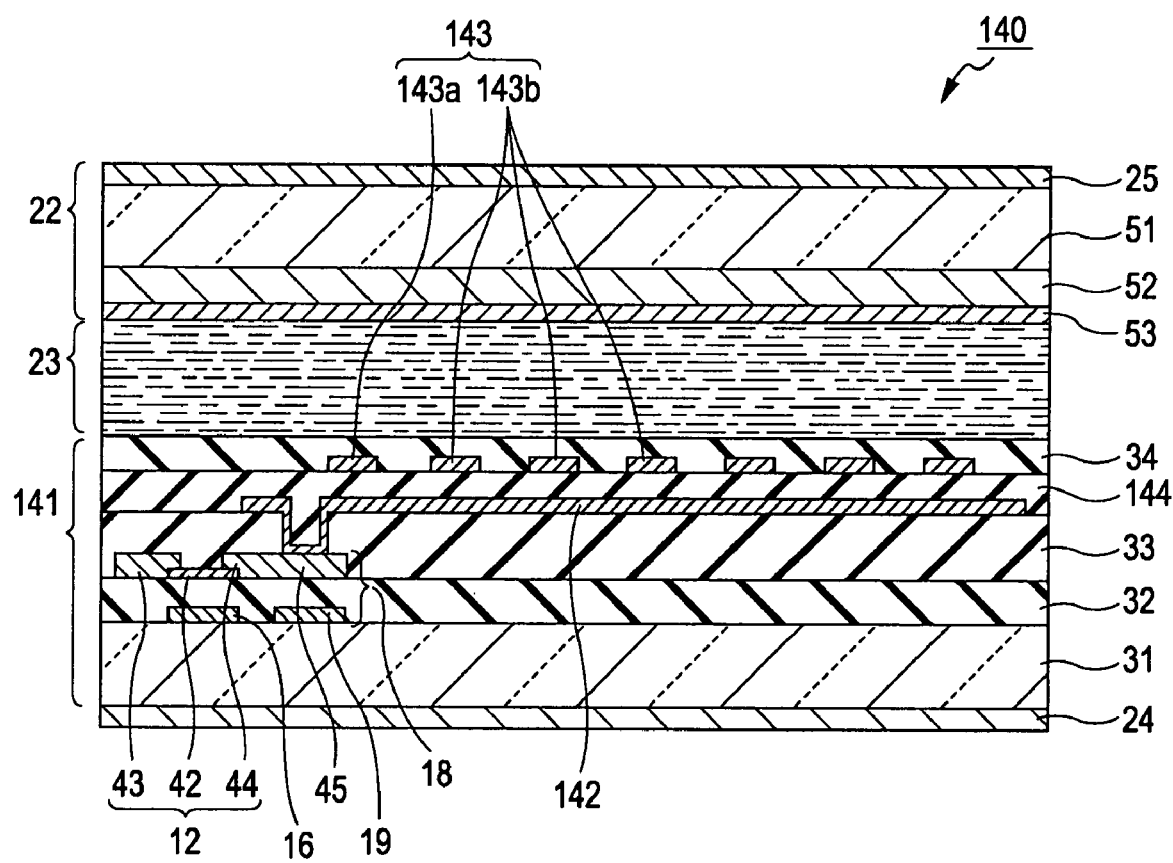
FIG. 12 is a cross sectional view taken along the line XII-XII of FIG. 11.

As shown in FIGS. 11 and 12, a pixel electrode 142 provided in an element substrate 141 is disposed at the outer surface side of a common electrode 143 in a liquid crystal display device 140 of the embodiment.

That is, as shown in FIG. 12, the element substrate 141 is equipped with a substrate main body 31 and a gate insulating film 32, an interlaying insulating film 33, an interelectrode insulating film (insulating layer) 144, and an alignment layer 34 sequentially laminated on the inner surface of the substrate main body 31.

Further, the element substrate 141 is equipped with a scanning line 16 and a capacitor line 19 which are disposed on the inner surface of the substrate main body 31, a data line 14 (shown in FIG. 11), a semiconductor layer 42, a source electrode 43, a drain electrode 44, and a capacitor electrode 45 disposed on the inner surface of the gate insulating film 32, a pixel electrode 142 disposed on the inner surface of the interlayer insulating film 33, a common electrode 143 disposed on the inner surface of the interelectrode insulating film 144.

The interelectrode insulating film 144 is constituted by a translucent material having insulating property such as, for example, nitride silicon or oxide silicon and covers the pixel electrode 142 formed on the interlayer insulating film 33.

The pixel electrode 142 extends along the X axis direction in a strip manner in plan view as shown in FIG. 11. Then, the pixel electrode 142 is connected to the capacitor electrode 45 via a contact hole formed in the interlayer insulating film 33. Herewith, the pixel electrode 142 and the drain of the TFT element 12 are connected.

The common electrode 143 has an approximately ladder shape in plan view and equipped with a frame portion 143 having a rectangle frame shape in plan view and a plurality of strip-shaped electrodes 143b (15 electrodes) extending in approximately the X axis direction and disposed in parallel with each other with a distance in the Y axis direction. The both ends of each of the strip shaped electrodes 143b are respectively connected to the frame portion 143a at portions extending in the Y direction.

Herein, the angle made by the extending direction of the strip-shaped electrodes 143b and the alignment direction of the alignment layer 34 which is the initial alignment direction of liquid crystal molecules in the sub pixel area displaying red color is set to 7 degrees. In addition, the angle made by the extending direction of the strip-shaped electrodes 143b and the alignment direction of the alignment layer 34 in the sub pixel area displaying green color is set to 5 degrees. Then, the angle made by the extending direction of the strip-shaped electrode 143b and the alignment direction of the alignment layer 34 in the sub pixel area displaying blue color is set to 3 degrees.

The same operation and effect can be obtained also in the liquid crystal display device 140 having the above structure. Note that the common electrode 143 may have a structure similar to that in the second embodiment or the third embodiment, and may have a multi domain structure similarly to the fourth embodiment.

Note that the invention is not limited to the above embodiments, and various modifications can be made without departing the scope of the invention.

For example, in the embodiments, the pixel electrode is formed on the interlayer insulating film and the common electrode is formed on the substrate main body. However, the common electrode may be formed on the interlayer insulating film and the pixel electrode may be formed on the substrate main body as far as the pixel electrode and the common electrode are disposed via an insulating layer. Herein, one of the electrode positioned at the liquid crystal layer side among the pixel electrode and the common electrode may have any other shape such as an approximately comb-like shape in plan view except the structure having slits (space between the strip-shaped electrodes) opened in the electrode in the embodiments as far as the shape allows the electric field generated between the pixel electrode and the common electrode to go through the liquid crystal layer.

Furthermore, the common electrode is formed on the element substrate with the scanning line and the capacitor line. However the common electrode may be formed on a layer different from the layer on which the scanning line and the capacitor line are disposed as far as the common electrode is disposed via the pixel electrode and the insulating layer.

Furthermore, the alignment direction of the alignment layer is set to the same direction for each sub pixel area and the extending direction of the strip-shaped electrodes constituting the pixel electrode is set to a different direction for each sub pixel area. However, the extending direction of the strip-shaped electrodes may be set to the same direction and the alignment direction of the alignment layer may be set to a different direction for every sub pixel area.

Furthermore, an angle applied to each of the strip-shaped electrodes is set so that the extending direction thereof is turned left with respect to the alignment direction of the alignment layer in plan view. However, the applied angle may be set so as to be turned right in plan view.

In addition, the angle made by the extending direction of the strip-shaped electrodes and the alignment direction of the alignment layer in the sub pixel area displaying red color is not limited to 7 degrees as far as the angle is not less than 4 degrees and not more than 10 degrees, and any angle may be employed as far as white display in which color is reduced can be performed with other sub pixel areas and the angle is relatively set small as compared with that of the other sub pixel areas as the wavelength of displayed color becomes short. Similarly, the angle made by the extending direction of the strip-shaped electrodes and the alignment direction of the alignment layer in the sub pixel area displaying green color is not limited to 5 degrees as far as the angle is not less than 2 degrees and not more than 8 degrees, and any angle may be employed. Similarly, the angle made by the extending direction of the strip-shaped electrodes and the alignment direction of the alignment layer in the sub pixel area displaying blue color is not limited to 3 degrees as far as the angle is not less than 0 degrees and not more than 6 degrees, and any angle may be employed. Furthermore, the angular difference of each sub pixel area is set to 2 degrees. However, another angle may be employed.

For example, the angle made by the extending direction of the strip-shaped electrodes and the alignment direction of the alignment layer in the sub pixel area displaying red color may be set to not less than 12 degrees and not more than 17 degrees, the angle made by the extending direction of the strip-shaped electrodes and the alignment direction of the alignment layer in the sub pixel area displaying green color may be set to not less than 7 degrees and not more than 12 degrees, and the angle made by the extending direction of the strip-shaped electrodes and the alignment direction of the alignment layer in the sub pixel area displaying blue color may be set to not less than 0 degrees and not more than 5 degrees.

Figure 13:
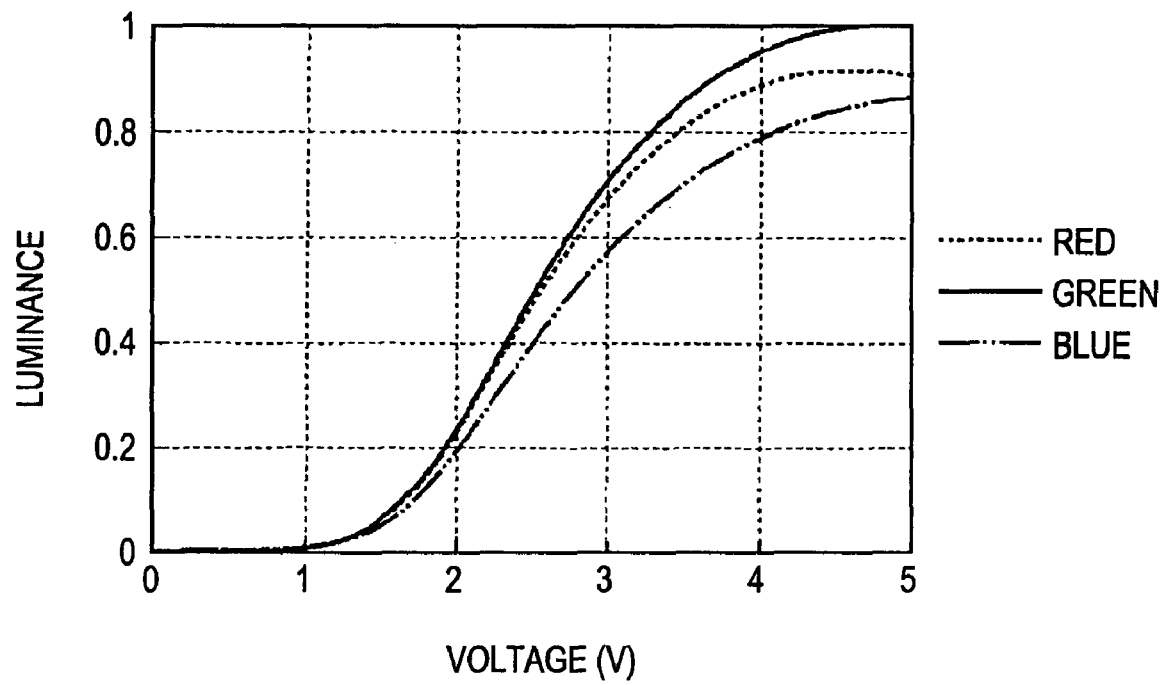
FIG. 13 is a graph showing a relation between applied voltage and luminance in each sub pixel area.

Herein, the relation between the voltage applied between the pixel electrode and the common electrode and the intensity of the light emitted from the counter substrate when the angle made by the extending direction of the strip-shaped electrodes and the alignment direction of the alignment layer in the sub pixel area displaying red color is set to 15 degrees, the angle made by the extending direction of the strip-shaped electrodes and the alignment direction of the alignment layer in the sub pixel area displaying green color is set to 10 degrees, and the angle made by the extending direction of the strip-shaped electrodes and the alignment direction of the alignment layer in the sub pixel area displaying blue color is set to 3 degrees is shown in FIG. 13. Note that in FIG. 13, relative luminance when the maximum value of the luminance in green color display shall be 1 is shown similarly to FIG. 5. As shown in FIG. 13, it is recognized that the voltage applied when luminance becomes the maximum can be matched for each color by adjusting the angle made by the extending direction of the strip-shaped electrodes and the alignment direction of the alignment layer for every sub pixel area. Herewith, white display in which color is reduced can be performed when applying the same voltage.

In this case, the difference of the angle in the sub pixel area displaying red color and the angle in the sub pixel area displaying green color is set to 5 degrees, and the difference of the angle in the sub pixel area displaying green color and the angle in the sub pixel area displaying blue color is set to 7 degrees. However, the angular differences are not limited to the values.

In addition, the angle made by the extending direction of the strip-shaped electrodes and the alignment direction of the alignment layer in the sub pixel area displaying red color may be set to not less than 18 degrees and not more than 23 degrees, the angle made by the extending direction of the strip-shaped electrodes and the alignment direction of the alignment layer in the sub pixel area displaying green color may be set to not less than 13 degrees and not more than 18 degrees, and the angle made by the extending direction of the strip-shaped electrodes and the alignment direction of the alignment layer in the sub pixel area displaying blue color may be set to not less than 2 degrees and not more than 7 degrees.

Figure 14:
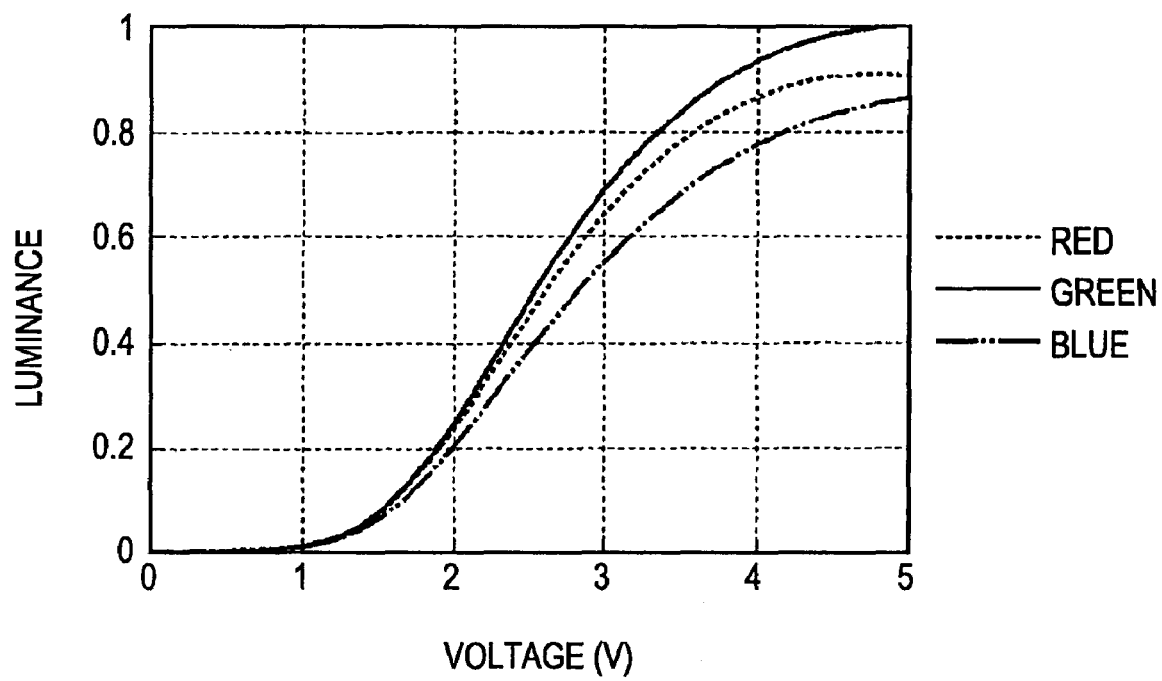
FIG. 14 is a graph showing a relation between applied voltage and luminance in each sub pixel area.

Herein, the relation between the voltage applied between the pixel electrode and the common electrode and the intensity of the light emitted from the counter substrate when the angle made by the extending direction of the strip-shaped electrodes and the alignment direction of the alignment layer in the sub pixel area displaying red color is set to 20 degrees, the angle made by the extending direction of the strip-shaped electrodes and the alignment direction of the alignment layer in the sub pixel area displaying green color is set to 15 degrees, and the angle made by the extending direction of the strip-shaped electrodes and the alignment direction of the alignment layer in the sub pixel area displaying blue color is set to 5 degrees is shown in FIG. 14. Note that in FIG. 14, relative luminance when the maximum value of the luminance when green color is displayed shall be 1 is shown similarly to FIG. 5. As shown in FIG. 14, it is recognized that the voltage applied when luminance becomes the maximum can be matched for each color by adjusting the angle made by the extending direction of the strip-shaped electrodes and the alignment direction of the alignment layer for every sub pixel area. Herewith, white display in which color is reduced can be performed when applying the same voltage.

In this case, the difference of the angle in the sub pixel area displaying red color and the angle in the sub pixel area displaying green color is set to 5 degrees, and the difference of the angle in the sub pixel area displaying green color and the angle in the sub pixel area displaying blue color is set to 10 degrees. However, the angular differences are not limited to the values.

In addition, the shape of the strip-shaped electrodes is not limited as far as at least the angle made by the center line in the width direction at the center portion in the length direction and the alignment direction of the alignment layer satisfies the relation described above in the sup pixel areas displaying each color. For example, the width may be changed along the length direction in the shape.

Further, the TFT element is used as a driving element for switching and controlling the pixel electrode in the liquid crystal display device. However, another driving element such as TFD (Thin Film Diode) element may be used instead of the TFT element.

In addition, normally black mode is employed in the liquid crystal display device. However, normally white mode may be employed.

In addition, the liquid crystal display device shall be a transmission type display device. However, the liquid crystal display device may be a semi-transmission type liquid crystal display device or a reflection type liquid crystal display device.

Then, the liquid crystal display device shall be a color liquid crystal display device displaying three colors of R, G, B. However, a structure equipped with a sub pixel area displaying another color may be employed as far as white can be displayed. Herein, the color filter layer may be provided on the element substrate instead of providing the color filter layer on the counter substrate.

Further, the electronic apparatus is not limited to the mobile phone as far as the electronic apparatus is equipped with the liquid crystal display device and may be image display means such as an electronic book, a personal computer, a digital still camera, a liquid crystal television, a viewfinder-type or monitor-direct-view-type vide tape recorder, a car navigation device, a pager, an electric calculator, a word processor, a work station, a video phone, a POS terminal, an apparatus having a touch panel, or the like.

What is claimed is:

1. A liquid crystal display device equipped with a pair of substrates sandwiching a liquid crystal layer and constituting a plurality of sub pixel areas arranged in a plane state, one of the substrates having a first electrode, a driving element connected to the first electrode, a second electrode, and an insulating layer provided between the first electrode and the second electrode, the liquid crystal display device performing a color display including three colors, red, green, and blue, whose wavelength regions are different from the plurality of sub pixel areas by driving liquid crystal molecules constituting the liquid crystal layer by an electric field generated between the first electrode and the second electrode, wherein one of the first and second electrodes is provided closer to the liquid crystal layer than the other electrode and is equipped with a plurality of strip-shaped portions arranged so as to extend in parallel with each other in the sub pixel area, the strip-shaped portions being spaced from each other with a predetermined space, the other electrode is provided in an area including the spaces and the plurality of strip-shaped portions in the sub pixel area, an angle between an extending direction of the strip-shaped portions of the one electrode provided in the sub pixel area displaying red color and an alignment direction of liquid crystal molecules in an initial state is not less than 4 degrees and not more than 10 degrees, an angle between an extending direction of the strip-shaped portions of the one electrode provided in the sub pixel area displaying green color and the alignment direction of liquid crystal molecules in the initial state is not less than 2 degrees and not more than 8 degrees, an angle between an extending direction of the strip-shaped portions of the one electrode provided in the sub pixel area displaying blue color and the alignment direction of liquid crystal molecules in the initial state is not less than 0 degrees and on the more than 6 degrees, a difference between (i) the angle between the extending direction of the strip-shaped portions of the one electrode provided in the sub pixel area displaying red color and the alignment direction and (ii) the angle between the extending direction of the strip-shaped portions of the one electrode provided in the sub pixel area displaying green color and the alignment direction is 2 degrees, a difference between (iii) the angle made by the extending direction of the strip-shaped portions of the one electrode provide in the sub pixel area displaying green color and the alignment direction and (iv) the angle made by the extending direction of the strip-shaped portions of the one electrode provided in the sub pixel area displaying blue color and the alignment direction is 2 degrees, the one substrate has an alignment film making contact with the liquid crystal layer and regulating the alignment direction of the liquid crystal molecules in the initial state, the alignment direction of the alignment film is the same direction in the plurality of sub pixel areas, and the other electrode is connected to the driving element controlling the electric field between the pair of electrodes.

2. The liquid crystal display device according to claim 1, wherein the one electrode has a connecting portion for connecting one ends of each of the plurality of strip-shaped portions to each other, and the other ends of each of the plurality of strip-shaped portions are respectively formed as an open end.

3. The liquid crystal display device according to claim 1, wherein the other electrode is connected to the driving element controlling the electric field between the pair of electrodes.

4. A liquid crystal display device equipped with a pair of substrates sandwiching a liquid crystal layer and constituting a plurality of sub pixel areas arranged in a plane state, one of the substrates having a first electrode, a driving element connected to the first electrode, a second electrode, and an insulating layer provided between the first electrode and the second electrode, the liquid crystal display device performing a color display including three colors, red, green, and blue, whose wavelength regions are different from the plurality of sub pixel areas, by driving liquid crystal molecules constituting the liquid crystal layer by an electric field generated between the first electrode and the second electrode, wherein one of the first and second electrodes is provided closer to the liquid crystal layer than the other electrode and is equipped with a plurality of strip-shaped portions arranged so as to extend in parallel with each other in the sub pixel area, the strip-shaped portions being spaced from each other with a predetermined space, the other electrode is provided in an area including the spaces and the plurality of strip-shaped portions in the sub pixel area, an angle between an extending direction of the strip-shaped portions of the one electrode provided in the sub pixel area displaying red color and an alignment direction of the liquid crystal molecules in an initial state is not less than 12 degrees and not more than 17 degrees, an angle between an extending direction of the strip-shaped portions of the one electrode provided in the sub pixel area displaying green color and the alignment direction of liquid crystal molecules in the initial state is not less than 7 degrees and not more than 12 degrees, an angle between an extending direction of the strip-shaped portions of the one electrode provided in the sub pixel area displaying blue color and the alignment direction of liquid crystal molecules in the initial state is not less than 0 degrees and not more than 5 degrees, a difference between (i) the angle between the extending direction of the strip-shaped portions of the one electrode provided in the sub pixel area displaying red color and the alignment direction and (ii) the angle between the extending direction of the strip-shaped portions of the one electrode provided in the sub pixel area displaying green color and the alignment direction is 5 degrees, a difference between (iii) the angle between the extending direction of the strip-shaped portions of the one electrode provided in the sub pixel area displaying green color and the alignment direction and (iv) the angle between the extending direction of the strip-shaped portions of the one electrode provided in the sub pixel area displaying blue color and the alignment direction is 7 degrees, the one substrate has an alignment film making contact with the liquid crystal layer and regulating the alignment direction of the liquid crystal molecules in the initial state, the alignment direction of the alignment film is the same direction in the plurality of sub pixel areas, and the other electrode is connected to the driving element controlling the electric field between the pair of electrodes.

5. The liquid crystal display device according to claim 4, wherein the one electrode has a connecting portion for connecting one ends of each of the plurality of strip-shaped portions to each other, and the other ends of each of the plurality of strip-shaped portions are respectively formed as an open end.

6. An electronic apparatus comprising the liquid crystal display device according to claim 4.

7. A liquid crystal display device equipped with a pair of substrates sandwiching a liquid crystal layer and constituting a plurality of sub pixel areas arranged in a plane state, one of the substrates having a first electrode, a driving element connected to the first electrode, a second electrode, and an insulating layer provided between the first electrode and the second electrode, the liquid crystal display device performing a color display including three colors, red, green, and blue, whose wavelength regions are different from the plurality of sub pixel areas, by driving liquid crystal molecules constituting the liquid crystal layer by an electric field generated between the first electrode and the second electrode, wherein one of the first and second electrodes is provided closer to the liquid crystal layer than the other electrode and is equipped with a plurality of strip-shaped portions arranged so as to extend in parallel with each other in the sub pixel area, the strip-shaped portions being spaced from each other with a predetermined space, the other electrode is provided in an area including the spaces and the plurality of strip-shaped portions in the sub pixel area, an angle between an extending direction of the strip-shaped portions of the one electrode provided in the sub pixel area displaying red color and an alignment direction of liquid crystal molecules in an initial state is not less than 18 degrees and not more than 23 degrees, an angle between an extending direction of the strip-shaped portions of the one electrode provided in the sub pixel area displaying green color and the alignment direction of liquid crystal molecules in the initial state is not less than 13 degrees and not more than 18 degrees, an angle between an extending direction of the strip-shaped portions of the one electrode provided in the sub pixel area displaying blue color and the alignment direction of liquid crystal molecules in the initial state is not less than 2 degrees and not more than 7 degrees, a difference between (i) the angle between the extending direction of the strip-shaped portions of the one electrode provided in the sub pixel area displaying red color and the alignment direction and (ii) the angle between the extending direction of the strip-shaped portions of the one electrode provided in the sub pixel area displaying green color and the alignment direction is 5 degrees, a difference between (iii) the angle between the extending direction of the strip-shaped portions of the one electrode provided in the sub pixel area displaying green color and the alignment direction and (iv) the angle between the extending direction of the strip-shaped portions of the one electrode provided in the sub pixel area displaying blue color and the alignment direction is 11 degrees, the one substrate has an alignment film making contact with the liquid crystal layer and regulating the alignment direction of the liquid crystal molecules in the initial state, the alignment direction of the alignment film is the same direction in the plurality of sub pixel areas, and the other electrode is connected to the driving element controlling the electric field between the pair of electrodes.

8. The liquid crystal display device according to claim 7, wherein the one electrode has a connecting portion for connecting one ends of each of the plurality of strip-shaped portions to each other, and the other ends of each of the plurality of strip-shaped portions are respectively formed as an open end.

9. An electronic apparatus comprising the liquid crystal display device according to claim 7.

* * * * *